United States Patent
Sakai

(10) Patent No.: US 7,992,783 B2
(45) Date of Patent: Aug. 9, 2011

(54) MOBILE TERMINAL AND CONTROL PROGRAM THEREOF

(75) Inventor: Kenichi Sakai, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 239 days.

(21) Appl. No.: 11/977,343

(22) Filed: Oct. 23, 2007

(65) Prior Publication Data

US 2008/0149716 A1    Jun. 26, 2008

(30) Foreign Application Priority Data

Dec. 20, 2006   (JP) .................................. 2006-342724

(51) Int. Cl.
*G06K 7/00* (2006.01)
(52) U.S. Cl. ....................................... 235/439; 235/435
(58) Field of Classification Search .................. 235/439, 235/449, 492, 375, 380
See application file for complete search history.

(56) References Cited

U.S. PATENT DOCUMENTS

| | | | |
|---|---|---|---|
| 7,641,122 B2 | 1/2010 | Shin et al. | |
| 2003/0006280 A1 | 1/2003 | Seita et al. | |
| 2004/0082362 A1* | 4/2004 | Peng et al. | 455/556.2 |
| 2005/0224587 A1* | 10/2005 | Shin et al. | 235/492 |
| 2007/0082704 A1* | 4/2007 | Nakano et al. | 455/558 |
| 2009/0093279 A1 | 4/2009 | Matsuura | |

FOREIGN PATENT DOCUMENTS

| | | |
|---|---|---|
| CN | 1681345 | 10/2005 |
| EP | 1 585 004 A2 | 10/2005 |
| EP | 1 585 004 A3 | 12/2005 |
| JP | 2001-069207 | 3/2001 |
| JP | 2003-016398 | 1/2003 |
| JP | 2005-303513 | 10/2005 |
| JP | 2006-013603 | 1/2006 |
| JP | 2006-338480 | 12/2006 |
| WO | WO 2006/087896 | 8/2006 |

* cited by examiner

*Primary Examiner* — Daniel A Hess
*Assistant Examiner* — Tabitha Chedekel
(74) *Attorney, Agent, or Firm* — Cohen Pontani Lieberman & Pavane LLP

(57) ABSTRACT

In a mobile terminal, a control section monitors a battery residual amount at a power supply section, if the battery residual amount is less than a preset threshold, it refers to the states of various flags stored in a flag table at a memory section. Subsequently, if the control section judges it is before exit after entry for a service for the object of a lock temporary release and an entry and exit usage service, it changes a noncontact IC card function section to a lock temporary release state. This allows the noncontact IC card function to be in a lock temporary release state, just before the power supply is turned off, even if the battery residual amount is low. Therefore, when the commuter gets off a train and passes through a station ticket gate, the commuter may use the noncontact IC card function.

8 Claims, 11 Drawing Sheets

FIG. 2

| FLAG | 0 | 1 | 2 |
|---|---|---|---|
| LOCK | NONCONTACT IC CARD FUNCTION NONLOCK STATE | NONCONTACT IC CARD FUNCTION LOCK STATE | |
| LOCK TEMPORARY RELEASE | NONCONTACT IC CARD FUNCTION NONLOCK TEMPORARY RELESE STATE | NONCONTACT IC CARD FUNCTION LOCK TEMPORARY RELEASE STATE AS FAR AS SPECIFIED SERVICE IS CONCERNED | |
| SERVICE KIND | NORMAL SERVICE | ENTRY/EXIT USAGE SERVICE | DATE DESIGNATION SERVICE |
| SPECIFIED SERVICE | SERVICE FOR OTHER THAN LOCK TEMPORARY RELESE | SERVICE FOR LOCK TEMPORARY RELESE | |
| ENTRY (IN CASE SERVICE KIND FLAG IS 1) | BEFORE ENTRY AFTER EXIT | BEFORE EXIT AFTER ENTRY | |
| SCHEDULED USE (IN CASE SERVICE KIND FLAG IS 2) | NO SCHEDULED USE WITHIN DESIGNATED TERM (FOR EXAMPLE, WITHIN 24 HOURS) | SCHEDULED USE WITHIN DESIGNATED TERM (FOR EXAMPLE, WITHIN 24 HOURS) | |

FIG. 3

FLAG TABLE 4-1

| No. | SERVICE KIND | FLAG | | | | |
|---|---|---|---|---|---|---|
| | | LOCK TEMPORARY RELEASE | SERVICE KIND | SPECIFIED SERVICE | ENTRY | SCHEDULED USE |
| 1 | ELECTRIC MONEY SERVICE | 0 | 0 | 0 | | |
| 2 | TRANSPORTATION TICKET SERVICE | 0 | 1 | 1 | | |
| 3 | ELECTRONIC TICKET SERVICE | 0 | 2 | 1 | o (A2) | |
| 4 | POINT CARD SERVICE | 0 | 0 | 0 | | o (A1) |

FIG. 9

FLAG TABLE (AFTER ENTRY)

| No. | SERVICE KIND | FLAG | | | |
|---|---|---|---|---|---|
| | | LOCK TEMPORARY RELEASE | SERVICE KIND | SPECIFIED SERVICE | ENTRY | SCHEDULED USE |
| 1 | ELECTRONIC MONEY SERVICE | 0 | 0 | 0 | | |
| 2 | TRANSPORTATION TICKET SERVICE | 1 | 1 | 1 | 1 | |
| 3 | ELECTRONIC TICKET SERVICE | 0 | 2 | 1 | | |
| 4 | POINT CARD SERVICE | 0 | 0 | 0 | | 0 |

FIG. 10

FLAG TABLE (THERE IS SCHEDULED USE WITHIN DESIGNATED TERM)

4-1

| No. | SERVICE KIND | FLAG |  |  |  |
|---|---|---|---|---|---|
|  |  | LOCK TEMPORARY RELEASE | SERVICE KIND | SPECIFIED SERVICE | ENTRY | SCHEDULED USE |
| 1 | ELECTRONIC MONEY SERVICE | 0 | 0 | 0 |  |  |
| 2 | TRANSPORTATION TICKET SERVICE | 0 | 1 | 1 | 0 |  |
| 3 | ELECTRONIC TICKET SERVICE | 1 | 2 | 1 |  | 1 |
| 4 | POINT CARD SERVICE | 0 | 0 | 0 |  |  |

C1, C2

MOBILE TERMINAL AND CONTROL PROGRAM THEREOF

CROSS-REFERENCE TO RELATED APPLICATION

This application is based upon and claims the benefit of priority from the prior Japanese Patent Application No. 2006-342724, filed Dec. 20, 2006, the entire contents of which is incorporated herein by reference.

BACKGROUND OF THE INVENTION

1. Field of the Invention

The present invention relates to a mobile terminal on which a noncontact IC card function is provided and a control program thereof.

2. Description of the Related Art

A lock function that disables the mobile terminal from using the noncontact IC card function is provided to prevent a third party from using the mobile terminal without the owner's authorization at the time of theft or loss of the mobile terminal on which the noncontact IC function is provided.

By the way, the noncontact IC function can be the object of a function that allows the mobile terminal to be used at a minimum level, the same as in an internal clock or the like, even when the residual amount of a battery is low in the mobile terminal.

However, the mobile terminal has a problem in that a function that locks the noncontact IC card function accompanied with a screen display can't be released if the residual amount of the battery is low in a lock state, because the function can't be an object at a time when the residual amount of the battery is low.

Particularly, if a commuter passes through one station ticket gate by using a transportation ticket service that is one of the services utilizing the noncontact IC card function and the residual amount of the battery is low before the commuter goes out of another station ticket gate, situations such that the commuter can't release the lock thereof and pass through the station ticket gate take place.

Otherwise, as in an electronic ticket, when a person is scheduled to use the noncontact IC card function within a predetermined term, a problem such that a scheduled service can't be received is liable to occur if the residual amount of the battery is low and the lock thereof can't be released. Then, the lock must be released in any manner.

Here, the lock release is to release the lock state of the noncontact IC card function to allow the noncontact IC card function to be used.

In the noncontact IC card function, as a method to release the lock, for example, a technology that a personal identification number (PIN) is preset by service and the noncontact IC card function is allowed to be used by authenticating the PIN to prevent a third party from wrongfully using the noncontact IC card function at the time of theft or loss is disclosed (for example, refer to Japanese Laid-Open (Kokai) Patent Publication No. 2003-16398).

In addition, Japanese Laid-Open (Kokai) Patent Publication No. 2006-13603 is disclosed as another related prior art.

This technology identifies a problem such that a commuter can't enter or go out of a station ticket gate if the residual amount of a battery is low and a power supply is turned off when the commuter utilizes the noncontact IC card function for entry/exit at a station ticket gate or the like. As a countermeasure to solve the problem, it is designed to prevent the lowering of a battery remaining amount by allowing the user to select either an authentication function or communication function of the noncontact IC card function at a time when the battery remaining amount becomes less than the threshold.

However, the related prior art disclosed in Japanese Laid-Open Publication No. 2003-16398 never touches on the problem that a noncontact IC card can't be used accompanied with the lowering of a battery remaining amount. Therefore, the related art has a problem that the lock can't be released if the residual amount of a battery is low in the lock state.

Meanwhile, in the related prior art disclosed in the Japanese Laid-Open Publication No. 2006-13603, it is said that the noncontact IC card may be used by a point at a time when any one of the functions (i.e., either the authentication function or communication function of the above-described noncontact IC card) can be preferentially used or by a time when any one of them can be preferentially used. However, the related art also has a problem such that the lock can't be released if the residual amount of a battery is low with the card locked as it stands and the power supply is turned off.

SUMMARY OF THE INVENTION

The present invention has been conceived in light of the foregoing situations, and is to provide a mobile terminal capable of releasing the lock and using a noncontact IC card function even if the residual amount of a battery is low and a power supply is turned off, and a control program thereof.

In order to achieve the above-described purpose, in accordance with one aspect of the present invention, there is provided a mobile terminal having a rechargeable battery and mounting a noncontact IC card function utilizing at least one service comprising, a lock setting memory means for storing a setting of whether or not to lock the noncontact IC card function, a lock control means for controlling the lock of the noncontact IC card function based on a set content of whether or not to lock the noncontact IC card function stored in the lock setting memory means, a battery remaining amount judging means for judging whether or not the battery remaining amount of the rechargeable battery is less than a predetermined threshold, and a lock release means for temporarily releasing the lock of the noncontact IC function if the noncontact IC card function is locked by the lock control means, and it is judged that the battery remaining amount is less than a predetermined threshold by the battery remaining amount judging means.

According to the present invention, an advantage that a noncontact IC card function can be used by temporarily releasing the lock even if a battery remaining amount is low and a power supply is turned off is obtained.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram for explaining states of various flags stored in a memory section 4 and their meanings according to the embodiment;

FIG. 3 is a conceptual diagram showing one state of a service table 4-1 according to the embodiment;

FIG. 9 is a conceptual diagram showing example states of flag table 4-1 which explains operations to transportation ticket services according to the embodiment;

FIG. 10 is a conceptual diagram showing example states of the flag table 4-1 for explaining operations to electronic ticket services according to the embodiment;

DETAILED DESCRIPTION OF THE PREFERRED EMBODIMENTS

The present invention will be hereinafter described in detail with reference to the preferred embodiments shown in the accompanying drawings.

A. Structure of Embodiment

Figure 1:
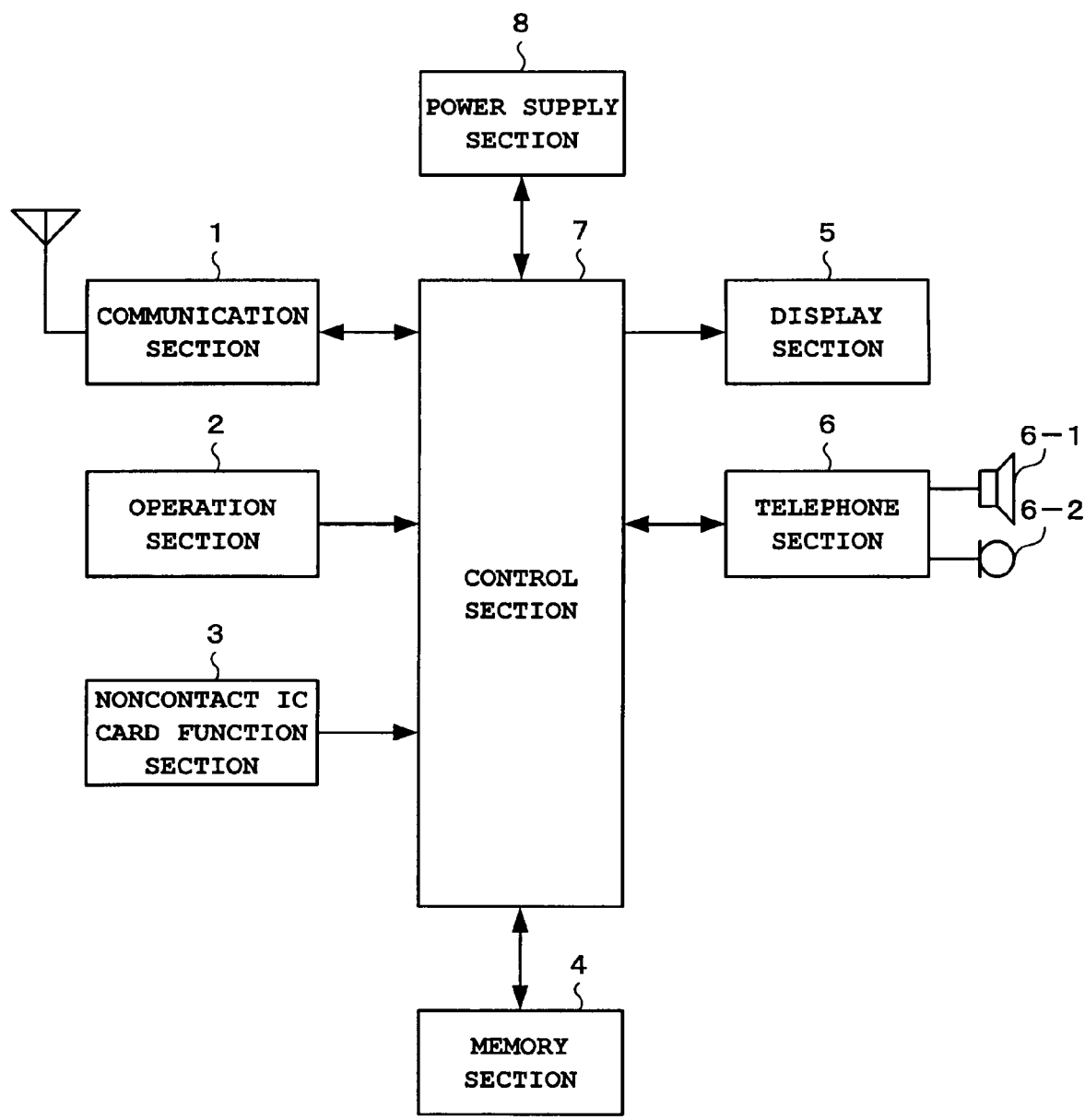
FIG. 1 is a block diagram showing a structure of a mobile terminal according to an embodiment of the present invention.

FIG. 1 is a block diagram showing a structure of a mobile terminal according to the embodiment of the invention. In FIG. 1, a communication section 1 performs voice calls, data communications and the like by controlling transmitting/incoming calls via an unillustrated wireless base station. An operation section 2 (lock temporary release instruction operation input means) inputs telephone numbers, various data, operation instructions and the like. A noncontact IC card function section 3 performs a two way communication with a reader in a very near distance of about 10 cm wirelessly, thereby realizing electronic money and prepaid card functions capable of paying prices for articles, fares of transportation systems and the like without dispensing any cash. The reader is a device that reads out card information disposed in a terminal device for providing services using a noncontact IC card function. Therefore, the noncontact IC card function section 3 realizes a noncontact IC card function.

A memory section 4 (lock setting memory means, usage date memory means, lock temporary release service kind memory means) stores predetermined programs, various parameters and the like (ROM), and at the same time, is used as a working area of control section 7 (RAM). Particularly, in the embodiment, the memory section 4 holds various flags such as lock flags, lock temporary release flags, service kind flags, specified service flags, and entry flags, scheduled use flags, and a service table that stores states of the above-described flags by service. The details of these various flags and the service table are described later. In addition, the memory section 4 stores schedule information. The date on which a noncontact IC card function is utilized is registered in advance in the schedule information. For example, even if movie and concert tickets and the like are purchased on web sites through the internet, the dates should be manually or automatically registered in the schedule information from the purchasing records and the like.

The display section 5 is, for example, composed of a Liquid Crystal Display (LCD), an organic Electro Luminescence (Organic EL) and the like, and displays terminal states such as radio field intensity and a battery remaining amount, data on applications such as e-mail documents, dynamic and static images, screens required to utilize the functions of a mobile terminal and the like. The telephone section 6 fetches voices from a microphone 6-2 in voice calls and converts the voices to digital signals and supplies the same to the control section 7, and concurrently converts voice signals on a call recipient's telephone to analog signals and outputs the same from a speaker 6-1.

The control section 7 controls the operations of the above-described sections in accordance with predetermined programs. Particularly, in the embodiment, the section is designed to perform normal transmission/reception processing, call processing, controlling of the noncontact IC card function section 3 (lock, lock temporary release, nonlock temporary release, notice to user and the like), detection of the battery remaining amount at the power supply section 8 and the like.

The control section 7 realizes the functions of the lock control means, battery remaining amount judging means, lock release means, entry and exit state judging means, usage schedule judging means, service kind judging means, and lock returning means. In addition, the display section 5 and the control section 7 realize the function of a notification means as a whole.

The power supply section 8 is composed of a rechargeable secondary battery and supplies electric power for operations to the above-described sections.

Next, FIG. 2 is a conceptual diagram for explaining states of various flags stored in the memory section 4 described above and their meanings. The lock flag is a flag that shows that the noncontact IC card function is in nonlock state if set at "0", and shows that the noncontact IC card function is in lock state if set at "1". In addition, although the lock flag should be set at "1" in default, it may be suitably changed by a user (the details are described later).

A lock temporary release flag is set by service, and is a flag shows that the noncontact IC card function is in nonlock temporary release state if set at "0", and shows that the noncontact IC card function is in lock temporary release state as far as a specified service is concerned if set at "1". In addition, the service kind flag is fixedly set by service, and is a flag that is set at "0" for normal services, is set at "1" for entry/exit usage services, and is set at "2" for date designation services.

A specified service flag is set by service, and is a flag that is set at "0" in the case of a service that is not an object of a lock temporary release, and is set at "1" in the case of a service that is the object of a lock temporary release. The specified service flag is, for example, beforehand set at either "0" or "1" in response to the kinds of services such as set at "0" if it is an electronic money service, set at "1" if it is a transportation ticket service, set at "1" if it is an electronic ticket service, and set at "0" if it is a point card service. However, it may be suitably changed by a user (the details are described later).

In addition, an entry flag is valid if the service kind flag is "1", is a flag that is set at "0" in the case of before entry after exit, and is set at "1" in the case of before exit after entry. And, a scheduled use flag is valid if the service kind flag is 2, is set at "0" if it is not scheduled to be used within a designated term (for example, within 24 hours), and is set at "1" if it is scheduled to be used within a designated term.

Next, FIG. 3 is a conceptual diagram showing one state of the above-described service table. As shown in FIG. 3, the lock temporary release flag, service kind flag, specified service flag, entry flag, and scheduled use flag are set by service in the service table 4-1. In the illustrated example, the lock temporary release flag is set at "0", the service kind flag is set at "0", and the specified service is set at "0" concerning the electronic money service. That is, there is shown the electronic money service is a normal service, is a service that is not the object of the lock temporary release, and is in nonlock temporary release state.

In addition, the lock temporary release flag is set at "0", the service kind flag is set at "1", the specified service flag is set at "1", and the entry flag is set at "0" concerning the transportation ticket service. That is, there is shown the transportation ticket service is an entry/exit service, is in nonlock temporary release state, and is in state before entry after exit.

In addition, the lock temporary release flag is set at "0", the service kind flag is set at "2", the specified service flag is set at "1", and the scheduled use flag is set at "0" concerning the electronic ticket service. That is, the electronic ticket service is a date designation service, is a service that is the object of a lock temporary release, is in nonlock temporary release state, and is not scheduled to be used within a designated term.

And, the lock temporary flag is set at "0", the service kind flag is set at "0", and the specified service flag is set at "0" concerning the point card service. That is, there is shown the point card service is a normal service, is a service that is not the object of a lock temporary release, and is in nonlock temporary release state.

B. Operations of Embodiment

The above-described operations of the embodiment will be described below.

Figure 4:
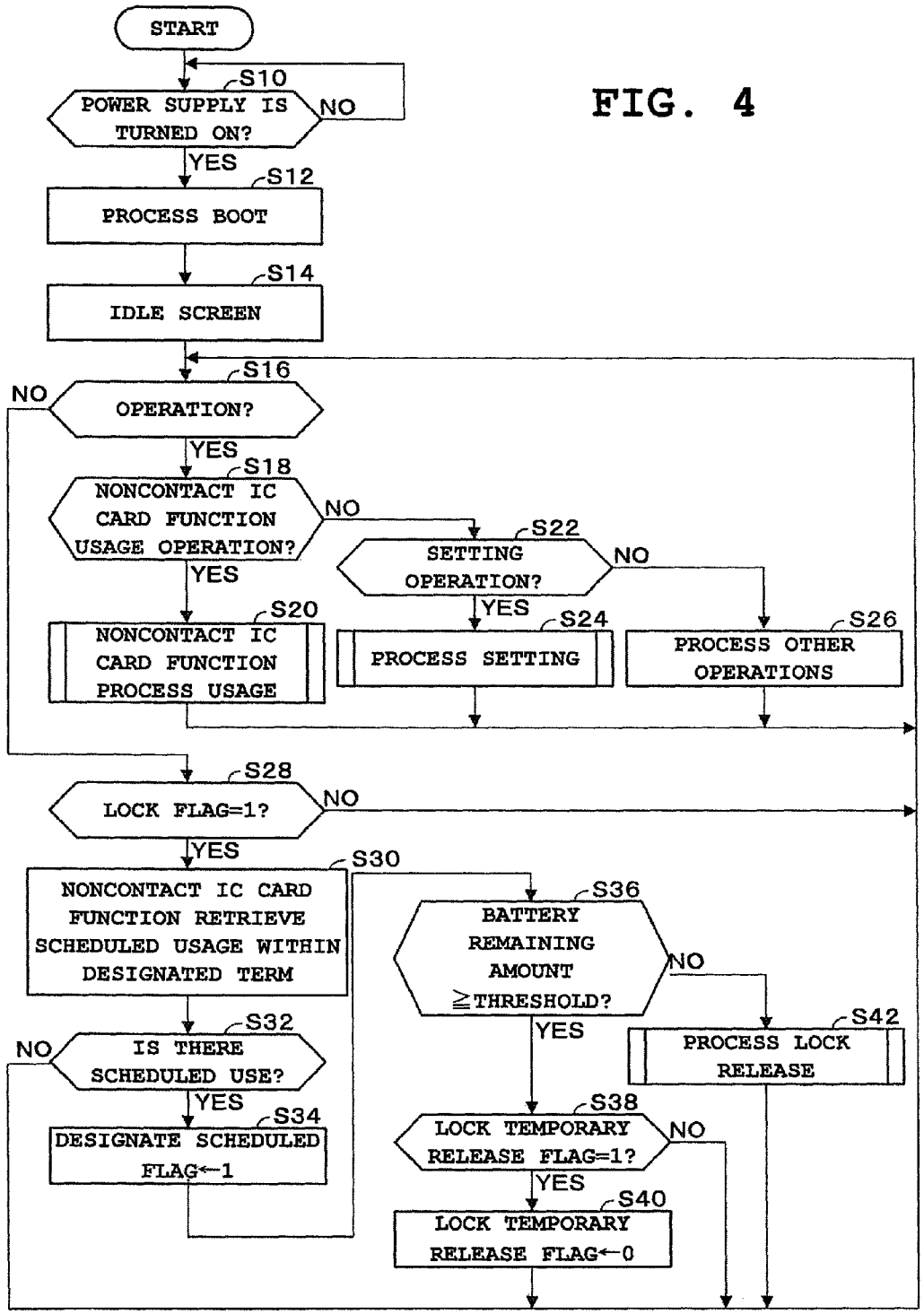
FIG. 4 is a flowchart for explaining operations of a mobile terminal (a main routine) according to the embodiment.

FIG. 4 is a flowchart for explaining the operations of the mobile terminal (main routine) according to the embodiment. In the first place, the system judges whether or not the power supply is turned on (Step S10), if turned on, it performs boot processing such as initialization of parameters required for operations (Step S12), and it displays an idle screen (Step S14). Next, it judges whether or not any operation is performed by a user (Step S16), if any operation is performed, it judges whether or not the operation is performed by utilizing a noncontact IC card function (Step S18).

Then, if the operation is performed by utilizing the noncontact IC card function, the system performs a noncontact IC card function usage processing (Step S20). The details of the noncontact IC card function utilization processing are described later. However, here, they are described plainly. That is, it is designed to judge the execution/non-execution of the service with reference to states of the above-described various flags, and a necessary flag is set when the service is performed in the noncontact IC card function utilization processing.

Meanwhile, if the operation is not performed by utilizing the noncontact IC card function, the system judges whether or not it is a setting operation (Step S22). Then, if the operation is a setting one, it performs setting processing (S24). The details of the setting processing are described later. However, here, they are simply described, it is designed to set the above-described various flags in the setting processing. Meanwhile, if the operation is not a setting processing, the system executes processing corresponding to other operations (Step S26) and returns to Step S14.

Meanwhile, if no operation is performed on the idle screen, it judges whether or not the lock flag is "1" (Step S28). As stated above, the lock flag is a flag that shows that the noncontact IC card function is in nonlock state if it is set at "0" and that the noncontact IC card function is in lock state if it is set at "1". Here, if the lock flag is with the noncontact IC card function set at "0" that is in nonlock state, no operation is performed and it returns to Step S14.

Meanwhile, if the lock flag is with the noncontact IC card function set at "1" that is in lock state, it detects a schedule information (data base) to see if the noncontact IC card function is scheduled to be used within a designated term (Step S30). In addition, it should be designed so that a date on which the noncontact IC card function is utilized is registered in advance in the schedule information. For example, even if movie and concert tickets are purchased on web sites through the internet, the date should be manually or automatically registered in the schedule information from the purchasing records and the like. Then, the system judges whether or not the noncontact IC card function is scheduled to be used within a designated term (Step S32), if it is not scheduled to be used, it performs no operation and returns to Step S14.

On the contrary, if the noncontact IC card function is scheduled to be used within a designated term, the scheduled use flag is set at "1" (Step S34). For example, as shown in flag table 4-1 shown in FIG. 3, concerning the electronic ticket service, in the electronic ticket service, the service kind flag is designed to use the noncontact IC card function at the time of entry and exit to and from a site at a predetermined date as in "2: a date designated service", that is, concerts and the like.

In the condition shown in FIG. 3, referring to the above-described example, the scheduled use flag of the electronic ticket service shows that "0: no schedule to be used" (A1), it is still in a state before a predetermined term of the concert on the same day. Then, if it becomes on the same day (within 24 hours before entry) as shown in Step S34 in FIG. 10, the scheduled use flag is set at "1: scheduled to be used within a designated term" (C1).

Next, the system judges whether or not a battery remaining amount is at a predetermined threshold or more (Step S36), if it is at the threshold or more, it judges whether or not the lock temporary flag is "1" (Step S38), if the lock temporary flag is "1", the lock temporary flag is set at "0", that is, it is designed so that the contact IC card function is in nonlock temporary release state (Step S40). This is because the noncontact IC card is in lock state again at a time when the power supply is tuned on again after charging the battery is performed when the lock temporary release flag is in "1: noncontact IC card function lock temporary release state". It returns to Step S14 thereafter.

Meanwhile, if the battery remaining amount becomes less than the threshold, the system performs lock release processing (Step S42) to return to Step S14. The details of the lock release processing are described later. However, explaining them briefly, if the battery remaining amount becomes less than the threshold in the lock release processing, the noncontact IC card function is designed to become in lock temporary release state so as to enable the noncontact IC card function to be used temporarily based on states of various flags in order to prevent the noncontact IC card function from being disabled by disabling the noncontact IC card function from releasing the lock of the noncontact IC card function. In addition, in the embodiment, as the release processing, there are described "automatic lock temporary release" that automatically releases the lock temporarily based on the states of various flags and "notice, and the lock temporary release by a user operation" that temporarily releases the lock in case the system judges that the state is in a state that may temporarily release the lock based on the states of the various flags, at first, the system notifies a user, then, the user gives an instruction operation of the lock temporary release in response to the notice.

Next, the above-described noncontact IC card function usage processing will be described.

Figure 5:
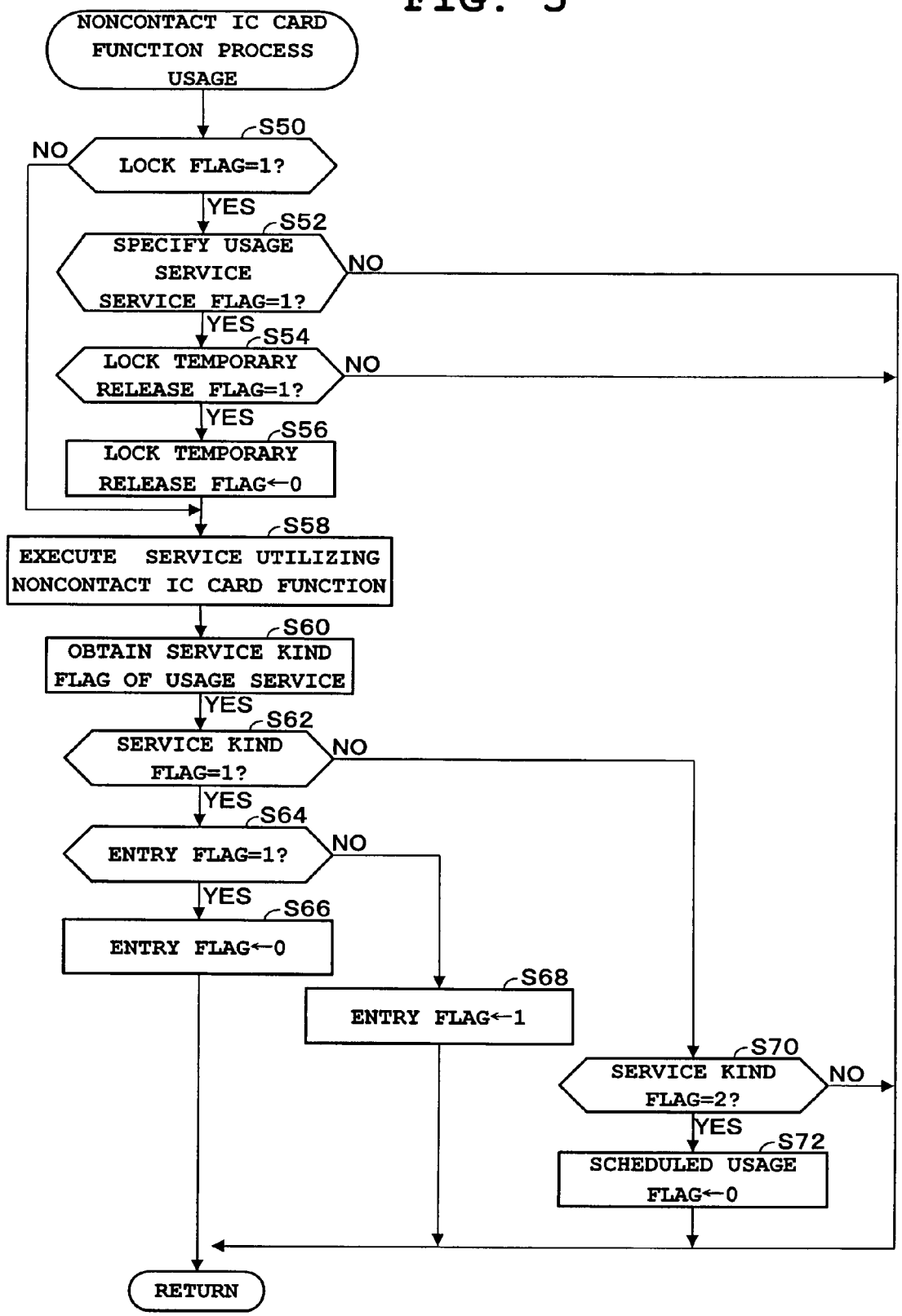
FIG. 5 is a flowchart for explaining operations of the noncontact IC card function usage processing according to the embodiment.

FIG. 5 is a flowchart for explaining the operations of the above-described noncontact IC card function usage processing. In the noncontact IC card function usage processing, the system judges first whether or not the lock flag is at "1", that is, whether or not the noncontact IC card function is in lock state (Step S50). Then, if the lock flag is at "1", it judges whether or not the specified service flag of a usage service is at "1", that is, whether or not it is a service for the object of a lock temporary release (Step S52).

Here, if it is a service for the object of a lock temporary release, it judges whether or not the lock temporary release flag is at "1", that is, whether or not the noncontact IC card function is in temporary release state (Step S54). Then, if the lock temporary flag is at "1", the lock temporary flag is set at "0" (Step S56) to execute a service utilizing a noncontact IC card function (Step S58).

Namely, in the above-described Steps S50 to S58, even if the noncontact IC card function is in lock state (lock flag="1"), it is a service for the object of a lock temporary release (specified service flag="1") and if a noncontact IC card function is in lock temporary release state (lock temporary release flag="1"), a service utilizing a noncontact IC card function is executed. In addition, in this case, because it is unnecessary to temporarily release the lock by executing the service utilizing a noncontact IC card function, the lock temporary flag is returned to "0" in Step S56.

On the contrary, if it is not a service for the object of a lock temporary release (specified service flag="0") or even if it is a service for the object of a lock temporary release in Step S52, and if it judges that the noncontact IC card function is in nonlock temporary release state (lock temporary release flag="0" in Step S54, it finishes the processing and returns to the above-described main routine without executing a service utilizing a noncontact IC card function.

In addition, if the noncontact IC card function is in nonlock state (lock flag="0"), it executes the service utilizing the noncontact IC card function, irrespective of the states of the above-described flags.

After it executes the service utilizing the noncontact IC card function in Step S58, it obtains the service kind flag of a usage service (Step S60), and it judges whether or not the service kind flag is at "1: entry/exit usage service" (Step S62). Then, if the service kind flag is at "1" showing an entry/exit usage service, it judges whether or not the entry flag is at "1", that is, whether or not it is after exit or before entry (Step S64). That is, if the noncontact IC card function is utilized in an entry/exit usage service, it judges that it is used at the time of either entry or exit.

Then, if the exit flag is "1", the entry flag is set at "0: before entry after exit" (Step S66) because the state of before exit after entry, in other words, what the noncontact IC card function is utilized at the time of exit is shown. Meanwhile, if an entry flag is not at "1", the entry flag is set at "1: before exit after entry" (Step S68) because the state of before entry after exit, in other words, what the noncontact IC card function is utilized at the time of entry. Thereafter, in either case, it returns to the main routine.

For example, if focusing on the transportation ticket service in the state of the flag table shown in FIG. 3, the service flag utilizes "1: entry/exit usage service", that is, an electric train or a bus on a regular route, the transportation ticket service is a service that uses the noncontact IC card function at the time of getting on/off them.

In the state shown in FIG. 3, the entry flag of the transportation ticket service is set at "0: before entry after exit" (A2), it is the state before getting on a bus if it is referred to in the above-described example. If the noncontact IC card function is used in this state, because the entry flag is set at "0", the entry flag is set at "1: before exit after entry", in this case, the state should be in getting on and still before getting off (B1) shown in FIG. 9 in Step S68. In addition, if the noncontact IC card function is used at the time of exit, the entry flag is set at "0: before entry after exit", in this case, it should be the state of getting off a train in Step S66, because the entry flag is set at "1" as shown in FIG. 9.

In addition, if the service kind flag is not at "1: entry/exit usage service", it judges whether or not the service kind flag is at "2: date designation service" (Step S70). Then, if the service kind flag is set at "2: date designation service", the scheduled use flag is set at "0: no schedule to be used within a designated term" (Step S72), and returns to the main routine. If the service kind flag is not at "2: date designation service", it performs nothing and returns to the main routine.

This is, for example, equivalent to an entry to a site in the above-described electronic ticket service. Namely, if the noncontact IC card function is used to show that a ticket is already purchased when entering the site, a state that the date designation service is completed is made by changing the scheduled use flag set at "1" in the above-described Step 34 to "0" in Step S72.

Next, the above-described lock release processing (automatic lock temporary release) will be described below.

Figure 6:
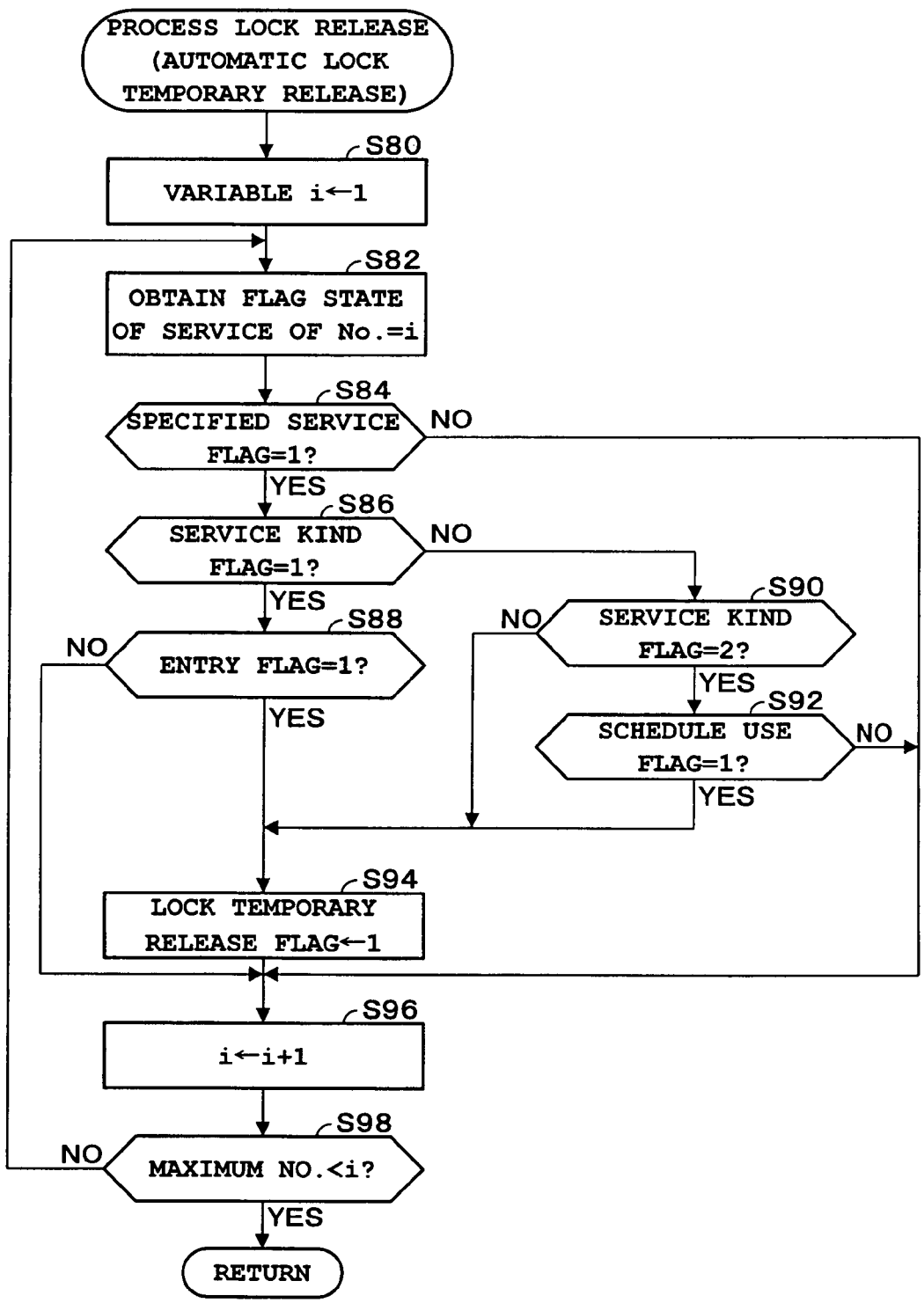
FIG. 6 is a flowchart for explaining operations of a lock release processing (automatic lock temporary release) according to the embodiment.

FIG. 6 is a flowchart for explaining the operations of the above-described lock release processing (automatic lock temporary release). In the lock release processing, at first, a variable i is changed to "1" (Step S80). Next, the system obtains the flag state of a service of No.=i with reference to the service table shown in FIG. 3 (Step S82).

The system judges whether or not a specified service flag is "1: a service for the object of a lock temporary release" (Step 84). Then, if the specified service flag is "1: a service for the object of a lock temporary release", it judges whether or not the service kind flag is "1: entry/exit usage service (Step S86). Then, if the service kind flag is "1: entry/exit usage service", it judges whether or not the entry flag is at "1: before exit after entry" (Step S88). Then, if the entry flag is "1: before exit after entry", the lock temporary release flag is set at "1: lock temporary release state of the noncontact IC card function as far as a specified service is concerned" (Step S94).

Namely, the noncontact IC card function should be in lock temporary release state if it is before exit after entry of a service for the object of a lock temporary release and an entry and exit usage service, just before a battery remaining amount is low and the power supply is turned off. This allows a visitor to get out of the site using the noncontact IC card function, because it is in lock temporary release state even if the power supply is turned off before exit after entry.

This is, for example, equivalent to a case that a battery remaining amount is lowered in a state that a passenger is in a train in the above-described transportation ticket service. Namely, because an entry flag is set at "1" in the state that the passenger is in the train, the lock temporary flag is changed to "1" as shown in FIG. 9 in Step S94 (B2), and the noncontact IC card is changed to the lock temporary release state. This allows the passenger to pay a train fare using the noncontact IC card function when getting off the train, because the lock is temporarily released even if the power supply is turned off before getting off the train by changing the noncontact IC card function to the lock temporary release state.

Meanwhile, if the entry flag is not at "1: before exit after entry", the lock temporary release flag is not changed to the lock temporary release state. Namely, if the battery remaining amount is low, the noncontact IC card should remain in nonlock temporary release state as it stands if it is before entry after exit for a service for the object of a lock temporary release and an entry and exit usage service. This allows unauthorized use of the mobile terminal by a third party to be prevented because the noncontact IC card function is in nonlock temporary release state and can't be used if the mobile terminal is turned off before entry after exit.

In addition, if the service kind flag is not at "1: entry and exit usage service" in Step S86, it judges whether or not the service kind flag is at "2: date designation service" (Step S90). Then, if the service kind flag is not at "2: date designation service", the lock temporary release flag is set at "1: lock temporary release state of noncontact IC card as far as a specified service is concerned" (Step S94).

Namely, if a battery remaining amount is lowered, the noncontact IC card is changed to the lock temporary release state for a service for the object of a lock temporary release and a normal service. This allows the noncontact IC card function to be used, because it is in lock temporary release state even if the power supply is turned off.

Meanwhile, if the service kind flag is 2: date designation service", it judges whether or not the scheduled use flag is at "1: scheduled to be used within a designated term" (Step S92). Then, if the scheduled use flag is "1: scheduled to be used within a designated term", the lock temporary release flag is set at "1: lock temporary release state of noncontact IC card as far as certified service is concerned" (Step S94).

Namely, if a battery remaining amount is lowered, the noncontact IC card function is scheduled to be used within a designated term of a service for the object of a lock temporary release and a date designation service, and the noncontact IC card function is changed to a lock temporary release state. This allows the noncontact IC card function to be used if it is scheduled to be used within a designated term, because it is in lock temporary release state even if the power supply is turned off.

This is, for example, equivalent to a case that a battery remaining amount is lowered before showing that a ticket is already purchased by using the noncontact IC card function in entering the site in the above-described electronic ticket service. In this case, because the scheduled use flag is set at "1: scheduled to be used" in the above described Step S34, it advances from Step S92 to Step S94, as shown in FIG. 10, the lock temporary release flag is changed to "1" (C2), and the noncontact IC card function is changed to be in lock temporary release state. Thus, even if the power supply is turned off before showing that the ticket is already purchased by changing the noncontact IC card function to be in lock temporary release state, the noncontact IC card function can be used at the time of exit because the lock is temporarily released.

In addition, if the usage schedule flag is not at "1: scheduled to be used within a designated term" in Step S92, the lock temporary release flag is not changed to be in lock temporary release state. Namely, when a battery remaining amount is low, if it is a service for the object of a lock temporary release and a date designation service and is not scheduled to be used within a designated term, the noncontact IC card function should remain in nonlock temporary release state as it stands. This allows unauthorized use by a third party to be prevented, because the noncontact IC card function can't be used as it is in nonlock temporary release state if the power supply is turned off with no scheduled use.

In addition, if the specified service flag is not at "1: a service for the object of a lock temporary release", the lock temporary release flag is not changed to be in lock temporary release state. Namely, if a battery remaining amount is lowered, the noncontact IC card function should remain in nonlock temporary release state for a service that is not a service for the object of a lock temporary release. This allows unauthorized use by a third party to be prevented, because the noncontact IC card function can't be used as it is in nonlock temporary release state if the power supply is turned off.

In any cases, a variable i is increased by 1 increment (Step S96), it judges whether or not the variable i exceeds the maximum number (Step S96). Then, if the variable i does not exceed the maximum number, it returns to Step S82, it repeats the above-described processing on the next service. Meanwhile, if the variable i exceeds the maximum number, it finishes the processing and returns to the main routine.

Figure 7:
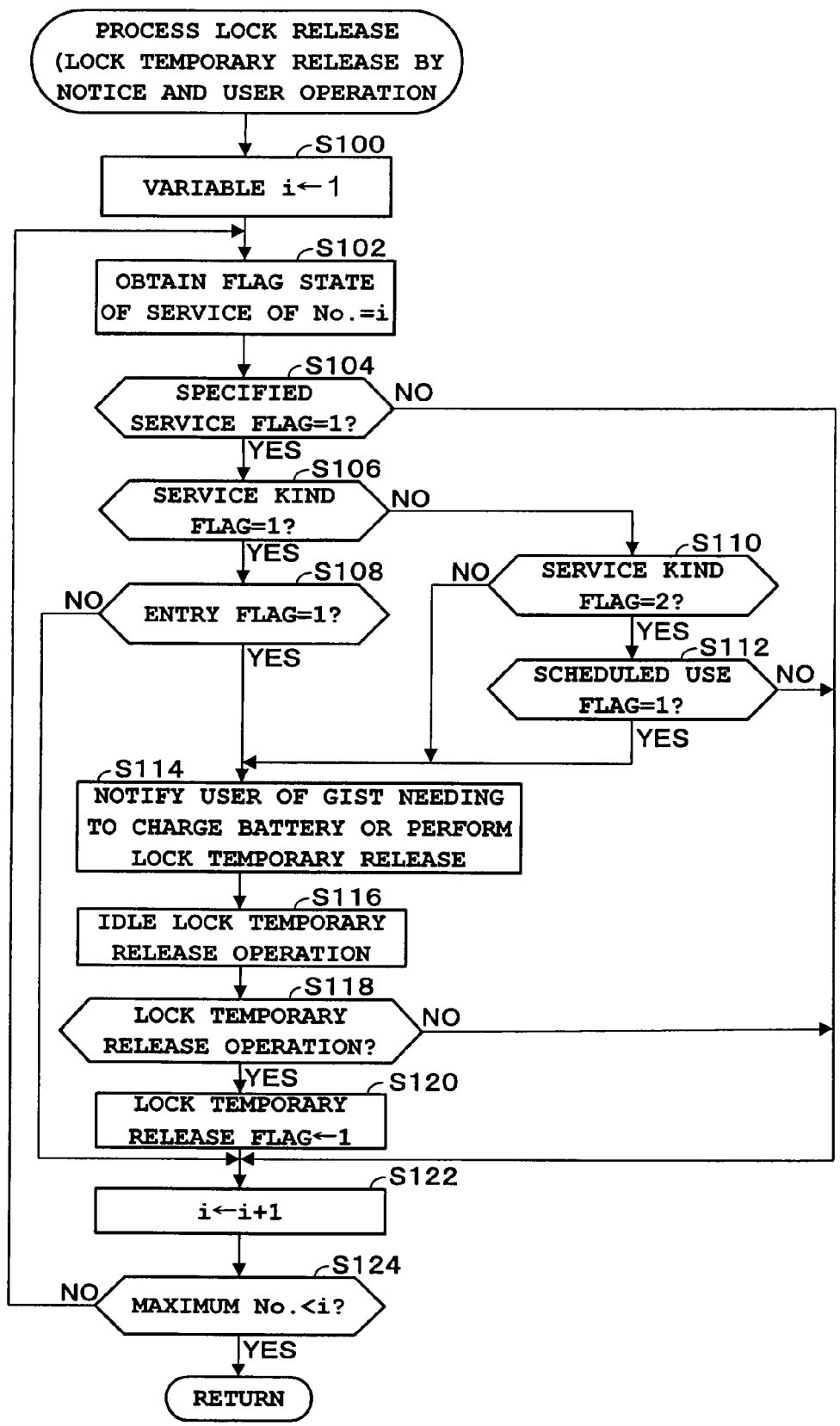
FIG. 7 is a flowchart showing operations of lock release processing (notice and lock temporary release by a user) according to the embodiment.

Next, the above-described lock release processing (notice and lock temporary release by a user operation) will be hereinafter described. FIG. 7 is a flowchart showing the operations of the above-described lock release processing (notice and lock temporary release by a user operation). The variable i is first changed to "1" (Step S100). Next, it obtains a flag state of the service of (Step S102).

In the first place, it judges whether or not the specified service flag is at "1: a service for the object of a lock temporary release" (Step S104). Then, if the specified service flag is at "1: a service for the object of a lock temporary release", it judges whether or not the service kind flag is at "1: entry/exit usage service" (Step S106). If the service kind flag is at "1: entry/exit usage service", it judges whether or not the entry flag is at "1: before exit after entry" (Step S108). Then, if the entry flag is at "1: before exit after entry", the system notifies a user of the gist that the user needs to charge the battery or to temporarily release the lock by displaying a message on the display 5 or the like (Step S114).

Next, it waits for a lock temporary release operation by the user (Step S116), and it judges whether or not a lock temporary release operation is performed (Step S118). Then, if the lock temporary release operation is performed by the user, it sets the lock release flag at "1: a lock temporary release state of the noncontact IC card function for only a specified service" (Step S120). Meanwhile, if a lock temporary release operation is not performed by the user, the lock temporary release flag is not changed to be in lock temporary release state.

Namely, when a battery remaining amount is lowered, if a service is a service for the object of a lock temporary release, is for an entry/exit usage service and is before exit after entry, it notifies of a user of the gist that the user needs to charge the battery or temporarily release the lock, and if a lock temporary release operation is performed by the user confirming the matter, it changes the noncontact IC card function to be in lock temporary release state, meanwhile, if a lock temporary release operation is not performed by the user, it does not change the noncontact IC card function to be in lock temporary release state. This allows unauthorized use by a third party to be prevented without deteriorating convenience, because it can select either a lock temporary release state or a nonlock temporary release state, even if the power supply is turned off before exit after entry.

Meanwhile, if the entry flag is not "1: before exit after entry" in Step S108, it does not change the lock temporary release flag to be in lock temporary release state. Namely, if a battery remaining amount is lowered, the noncontact IC card function should remain in nonlock temporary release state as it stands, if a service is before entry after exit for a service for the object of a lock temporary release and an entry and exit usage service. This allows unauthorized use by a third party to be prevented because it is in nonlock temporary release state and the noncontact IC card function can't be used if the power supply is tuned off before entry after exit.

If the service kind flag is not "1: entry/exit usage service" in Step S106, the system judges whether or not the service kind flag is at "2: a date designation service" (Step S110). Then, if the service kind flag is not at "2: a date designation service", the system notifies a user of the gist that the user needs to charge the battery or temporarily release the lock by displaying a message on the display 5 or the like (Step S114).

The system waits for a lock temporary release operation by a user likewise hereinafter (Step S116), and judges whether or not a lock temporary release operation is performed (Step S118), if a lock temporary release operation is performed by a user, it sets the lock temporary flag at "1: a lock temporary release state of the noncontact IC card function for only a specified service" (Step S120). Meanwhile, if a lock temporary release operation is not performed by a user, it does not set the lock temporary release flag at a lock temporary release state.

Namely, when a battery remaining amount is low, if the system notifies a user of the gist that the user needs to charge a battery or temporarily release the lock with regard to a service for the object of a lock temporary release and a normal service and a lock temporary release operation is performed by a user confirming the matter, the system allows the noncontact IC card function to become in lock temporary release state, meanwhile, if a lock temporary release operation is not performed by the user, it does not allow the function to become in lock temporary release state. This allows unauthorized use by a third party to be prevented without deteriorating convenience, because it can select either a lock temporary release state or a nonlock temporary release state in response to a user operation, even if the power supply is turned off.

Meanwhile, if the service kind flag is at "2: a date designation service", the system judges whether or not the usage schedule flag is at "1: scheduled to be used within a designated term" (Step S112). Then, if the usage schedule flag is at "1: scheduled to be used within a designated term", it notifies a user of the gist that the user needs to charge the battery or temporarily release the lock by displaying a message on the display section 5 or the like.

The system waits for a lock temporary release operation by a user likewise hereinafter (Step S116), and judges whether or not a lock temporary release operation is performed (Step S118), if a lock temporary release operation is performed by a user, it sets the lock temporary release flag at "1: a lock temporary release state of the noncontact IC card function for only a specified service" (Step S120). Meanwhile, if a lock temporary release operation is not performed by a user, the lock temporary release flag is not changed to be in a lock temporary release flag.

Namely, when a battery remaining amount is low, the system notifies a user of the gist that the user needs to charge the battery or temporarily release the lock with regard to a service for the object of a lock temporary release and a date designation service, if a lock temporary release operation is performed by a user confirming the matter, the system sets the noncontact IC card function to be in lock temporary release state, meanwhile, if a lock temporary release operation is not performed by a user, it does not set the function to be in lock temporary release state. This allows unauthorized use by a third party to be prevented without deteriorating convenience, because it can select either a lock temporary release or a nonlock temporary release state in response to a user operation, even if the power supply is turned off.

In addition, if the usage schedule flag is not at "1: scheduled to be used a designated term" in Step S112, the system does not set a lock temporary release flag at a lock temporary release state. Namely, when a battery remaining amount is low, a service is a service for the object of a lock temporary release and a date designation service, and is not scheduled to be used within a designated term, the noncontact IC card function should remain in a nonlock temporary release state as it stands. This allows unauthorized usage by a third party to be prevented, because the nonlock temporary release state remains intact and as a result, the noncontact IC card function can't be used, even if the power supply is turned off with no schedule to be used.

In addition, if the specified service flag is not at "1: a service for the object of a lock temporary release", the system does not set the lock temporary flag in a lock temporary release state. Namely, if a battery remaining amount is lowered, the noncontact IC card function should remain in a nonlock temporary release state as it stands with regard to a service that is not a service for the object of a lock temporary release. This allows unauthorized use by a third party to be prevented because the function remains in a nonlock temporary release state, even if the power supply is turned off.

In any case, next, a variable i is increased by one increment (Step S122), and the system judges whether or not the variable i exceeds the maximum number (Step S124). Then, if it does not exceed the maximum number, the system returns to Step S102 and repeats the above-described processings. Meanwhile, if the variable i exceeds the maximum number, the system finishes the processing and returns to the main routine.

Next, the above-described setting processing will be described below.

Figure 8:
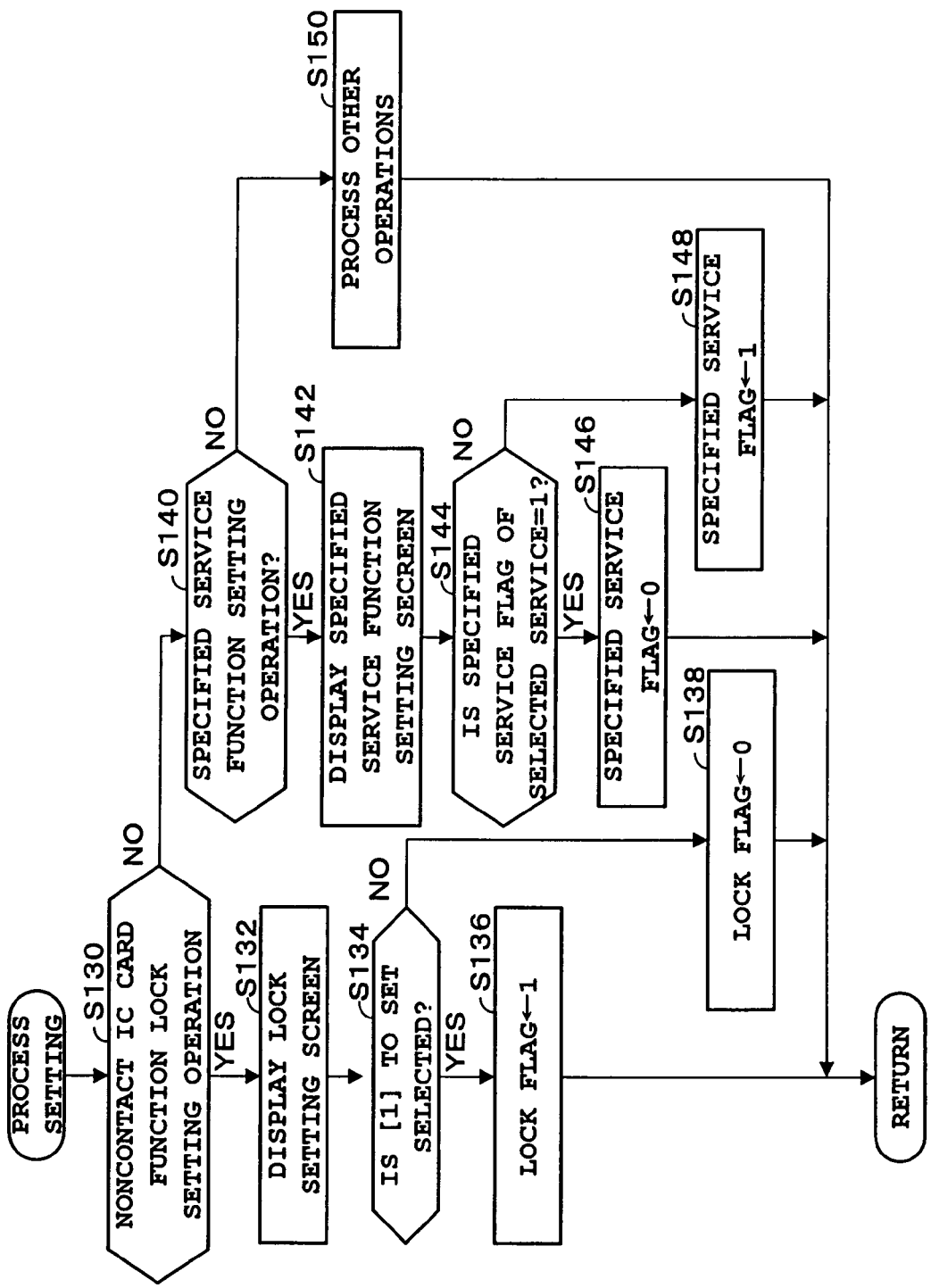
FIG. 8 is a flowchart for explaining operations of the setting processing according to the embodiment.
Figure 11:
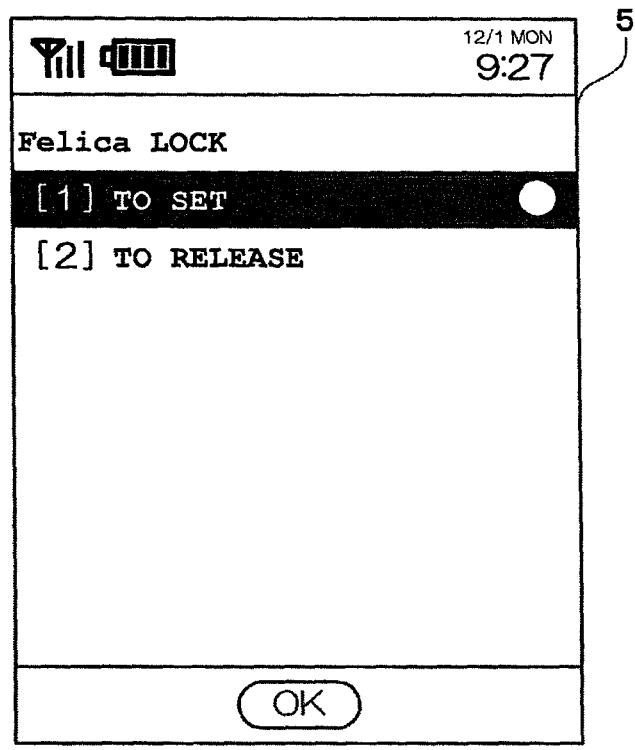
FIG. 11 is a typical diagram showing an example screen at a time when a lock flag is set according to the embodiment.

FIG. 8 is a flowchart for explaining the operations of the above-described setting processings. In the setting processings, at first, the system judges whether or not a setting processing is a noncontact IC card function lock setting operation (Step S130), if it is a noncontact IC card function lock setting, the system displays a lock setting screen on the display section 5 as shown in FIG. 11 (Step S132).

1" to set and "2" to release are displayed as menus on the lock setting screen, and a ring (icon) showing at which it is currently set is displayed alongside an item corresponding thereto based on the state of a lock flag. Because a ring (icon) is displayed on a side on which "1" to set is made in an illustrated example, the noncontact IC card function is locked. A user selects either "1" to set or "2" to release at an operation section 2 on a lock setting screen as shown in FIG. 11 to perform a decision operation (equivalent to an OK selection at a lower portion on the screen).

In the mobile terminal (particularly, what is a control section 7, hereinafter the same), if a decision operation is performed by a user after a lock setting screen is displayed, the system judges whether or not "1" to set is selectively decided (Step S134). Then, if "1" to set is selectively decided, it sets the lock flag at "1: a locked condition" (Step S136) and thereafter, returns to the main routine. Meanwhile, if "2" to release is selectively decided, it sets the lock flag at "0: a nonlock state" (Step S138), and thereafter it returns to the main routine.

Figure 12:
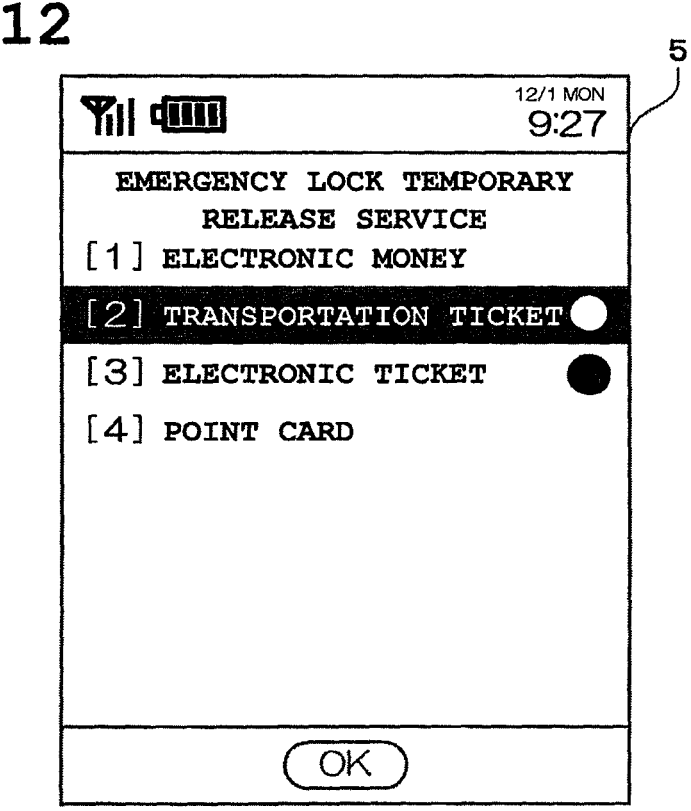
FIG. 12 is a typical diagram showing an example screen at a time when a lock temporary release flag is set according to the embodiment.

Next, if a setting operation is not a noncontact IC card function lock setting operation, the system judges whether or not it is a specified service setting operation (Step S140), if it is a specified service function setting operation, it displays a specified service function setting screen at the display section as shown in FIG. 12 (Step S142), a list of services such as "[1] electronic money, [2] transportation ticket, [3] electronic ticket, and [4] point card" are displayed on the specified service function setting screen, and a ring (icon) is displayed alongside the service currently set at which a service for the object of a lock temporary release. The user selects a service setting at either a service that is not the object of a lock temporary release or a service that is the object of a lock temporary release at the operation section 2 to perform a decision operation (equivalent to an OK selection at a lower portion of the screen).

In the mobile phone (control section 7), if a decision operation is performed by the user after the specified service function setting screen is displayed, the system judges whether or not a specified service flag of the selected service is at "1" (Step S144). Then, if the specified service flag of the selected service is at "1", namely, if it is set at a service that is the object of a lock temporary release, it sets the specified service flag at "0: a service that is not the object of a lock temporary release" (Step S146), and thereafter it returns to the main routine. Meanwhile, if the specified service flag of the selected service is at "0", namely, if it is set at a service that is not the object of a lock temporary release, it sets the specified service flag at "1: a service that is the object of a lock temporary release" (Step S148), and thereafter it returns to the main routine.

In addition, if a setting operation is neither a noncontact IC card function lock setting operation nor a specified service function setting operation, other operation processings in response to a setting operation (Step S150) return to the main routine.

According to the above-described embodiment, if a battery remaining amount is low and a user does not notice it, temporarily releasing the lock of a noncontact IC card function allows a stationary locking of the noncontact IC card function to be prevented, thereby enabling the system to continuously use services.

In addition, safety at the time of lock temporary release can be further increased by limiting lock releasing to highly urgent services that uses them at the time of entry/exit such as specified services, particularly transportation tickets.

In addition, if a noncontact IC card function is scheduled to be used within a predetermined term and a noncontact IC card function is locked and it judges that a battery remaining amount is less than a predetermined threshold, the lock of a noncontact IC card function is temporarily released to be able to prevent the noncontact IC card function from being locked as it stands, thereby enabling the system to continuously use services.

In addition, if a noncontact IC card function is locked with regard to a service to be used for only a service that is for the object of a lock temporary release, and it judges that a battery remaining amount is less than a predetermined threshold, locking of the noncontact IC card function is temporarily released. Therefore, this allows unauthorized use by a third party to be prevented after the lock of the function is carelessly released.

In addition, after a lock state of the noncontact IC card is temporarily released, if a battery remaining amount becomes more than a predetermined threshold, because the noncontact IC card function is returned to a lock state, unauthorized use by a third party can be prevented.

In addition, after a lock state of the noncontact IC card function is temporarily released, if an utilization of the noncontact IC card function is completed, because the noncontact IC card function is returned to a lock state, unauthorized use by a third party can be prevented.

In addition, if a battery remaining amount is low, the system can notify a user of under what condition the mobile terminal is by notifying the user of the gist that the user needs to charge the battery or release the locking of the noncontact IC card function.

In addition, the system notifies a user of the gist that the user needs to charge the battery or release the locking of the noncontact IC card function, if the user performs an operation for temporarily releasing the locking of the noncontact IC card function in response to the notice, because the locking of the noncontact IC card function is designed to be temporarily released, the locking of the noncontact IC card function can be more definitely and more safely released.

Furthermore, although the computer program product of the mobile terminal which is a preferred embodiment of the present invention is stored in the memory (for example, ROM, etc.) of the mobile terminal, this processing program is stored on a computer-readable medium and should also be protected in the case of manufacturing, selling, etc. of only the program. In that case, the method of protecting the program with a patent will be realized by the form of the computer-readable medium on which the computer program product is stored.

What is claimed is:

1. A mobile terminal having a rechargeable battery with a noncontact IC card function used for at least one service, comprising:
   a usage time period memory means for storing a time period for using the noncontact IC card function;
   a usage schedule judging means for judging whether or not the noncontact IC card function is scheduled to be used within a predetermined term based on the time period stored in the usage time period memory means;
   a lock setting memory means for storing a setting of whether or not to lock the noncontact IC card function;
   a lock controlling means for locking the noncontact IC card function based on the setting content stored in the lock setting memory means of whether or not to lock the noncontact IC card function;
   a battery remaining amount judging means for judging whether or not the battery remaining amount of the rechargeable battery is less than a predetermined threshold; and
   a lock releasing means for temporarily releasing the lock of the noncontact IC card function when a judgment is made by the usage schedule judging means that the noncontact IC card function is scheduled to be used within the predetermined term, the noncontact IC card function has been locked by the lock controlling means, and a judgment is made by the battery remaining amount judging means that the battery remaining amount is less than the predetermined threshold.

2. The mobile terminal according to claim 1 further comprising:
   a lock returning means for, after temporarily releasing a locked state of the noncontact IC card function by the lock releasing means, returning the noncontact IC card function to the lock state, when a judgment is made by the battery remaining amount judging means that the battery remaining amount is more than the predetermined threshold.

3. The mobile terminal according to claim 1 further comprising:
   a lock returning means for, after temporarily releasing a locked state of the noncontact IC card function by the lock releasing means, returning the noncontact IC card function to the locked state, when usage of the noncontact IC card function has been completed.

4. A mobile terminal having a rechargeable battery with a noncontact IC card function used for at least one service, comprising:
   an entry and exit state judging means for judging, when the noncontact IC card function is used upon entering and exiting a transportation system, whether or not an entry and exit state of the IC card function is after entering and before exiting the transportation system;
   a lock setting memory means for storing a setting of whether or not to lock the noncontact IC card function;
   a lock controlling means for locking the noncontact IC card function based on the setting content stored in the lock setting memory means of whether or not to lock the noncontact IC card function;
   a battery remaining amount judging means for judging whether or not the battery remaining amount of the rechargeable battery is less than a predetermined threshold;
   a lock releasing means for temporarily releasing the lock of the noncontact IC card function, when a judgment is made by the entry and exit state judging means as being after entering and before exiting the transportation system, the noncontact IC card function has been locked by the lock controlling means, and a judgment is made by the battery remaining amount judging means that the battery remaining amount is less than the predetermined threshold; and
   a lock returning means for, after temporarily releasing a locked state of the noncontact IC card function by the lock releasing means, returning the noncontact IC card function to the lock state, when a judgment is made by the battery remaining amount judging means that the battery remaining amount is more than the predetermined threshold.

5. A mobile terminal having a rechargeable battery with a noncontact IC card function used for at least one service, comprising:
   an entry and exit state judging means for judging, when the noncontact IC card function is used upon entering and exiting a transportation system, whether or not an entry and exit state of the IC card function is after entering and before exiting the transportation system;
   a lock setting memory means for storing a setting of whether or not to lock the noncontact IC card function,
   a lock controlling means for locking the noncontact IC card function based on the setting content stored in the lock setting memory means of whether or not to lock the noncontact IC card function;
   a battery remaining amount judging means for judging whether or not the battery remaining amount of the rechargeable battery is less than a predetermined threshold;
   a lock releasing means for temporarily releasing the lock of the noncontact IC card function, when a judgment is made by the entry and exit state judging means as being after entering and before exiting the transportation system, the noncontact IC card function has been locked by the lock controlling means, and a judgment is made by the battery remaining amount judging means that the battery remaining amount is less than the predetermined threshold; and
   a lock returning means for, after temporarily releasing a locked state of the noncontact IC card function by the lock releasing means, returning the noncontact IC card function to the locked state, when usage of the noncontact IC card function has been completed.

6. A non-transitory computer-readable storage medium having a program stored thereon that is executable by a computer for controlling a mobile terminal having a rechargeable battery with a noncontact IC card function used for at least one service, comprising:
   a usage time period memory processing for storing a time period for using the noncontact IC card function;
   a usage schedule judging processing for judging whether or not the noncontact IC card function is scheduled to be used within a predetermined term based on the time period stored in the usage time period memory processing;
   a lock setting memory processing for storing a setting of whether or not to lock the noncontact IC card function;
   a lock controlling processing for locking the noncontact IC card function based on the setting content stored in the lock setting memory processing of whether or not to lock the noncontact IC card function;
   a battery remaining amount judging processing for judging whether or not the battery remaining amount of the rechargeable battery is less than a predetermined threshold; and
   a lock releasing processing for temporarily releasing the lock of the noncontact IC card function when a judgment is made by the usage schedule judging processing that the noncontact IC card function is scheduled to be used within the predetermined term, the noncontact IC card function has been locked by the lock controlling processing, and a judgment is made by the battery remaining amount judging processing that the battery remaining amount is less than the predetermined threshold.

7. A non-transitory computer-readable storage medium having a program stored thereon that is executable by a computer for controlling a mobile terminal having a rechargeable battery with a noncontact IC card function used for at least one service, comprising:
   an entry and exit state judging processing for judging, when the noncontact IC card function is used upon entering and exiting a transportation system, whether or not an entry and exit state of the IC card function is after entering and before exiting the transportation system;
   a lock setting memory processing for storing a setting of whether or not to lock the noncontact IC card function;
   a lock controlling processing for locking the noncontact IC card function based on the setting content stored in the lock setting memory processing of whether or not to lock the noncontact IC card function;
   a battery remaining amount judging processing for judging whether or not the battery remaining amount of the rechargeable battery is less than a predetermined threshold;
   a lock releasing processing for temporarily releasing the lock of the noncontact IC card function, when a judgment is made by the entry and exit state judging processing as being after entering and before exiting the transportation system, the noncontact IC card function has been locked by the lock controlling processing, and a judgment is made by the battery remaining amount judging processing that the battery remaining amount is less than the predetermined threshold; and
   a lock returning processing for, after temporarily releasing a locked state of the noncontact IC card function by the lock releasing processing, returning the noncontact IC card function to the lock state, when a judgment is made by the battery remaining amount judging processing that the battery remaining amount is more than the predetermined threshold.

8. A non-transitory computer-readable storage medium having a program stored thereon that is executable by a computer for controlling a mobile terminal having a rechargeable battery with a noncontact IC card function used for at least one service, comprising:
an entry and exit state judging processing for judging, when the noncontact IC card function is used upon entering and exiting a transportation system, whether or not an entry and exit state of the IC card function is after entering and before exiting the transportation system;
a lock setting memory processing for storing a setting of whether or not to lock the noncontact IC card function;
a lock controlling processing for locking the noncontact IC card function based on the setting content stored in the lock setting memory processing of whether or not to lock the noncontact IC card function;
a battery remaining amount judging processing for judging whether or not the battery remaining amount of the rechargeable battery is less than a predetermined threshold;
a lock releasing processing for temporarily releasing the lock of the noncontact IC card function, when a judgment is made by the entry and exit state judging processing as being after entering and before exiting the transportation system, the noncontact IC card function has been locked by the lock controlling processing, and a judgment is made by the battery remaining amount judging processing that the battery remaining amount is less than the predetermined threshold; and
a lock returning processing for, after temporarily releasing a locked state of the noncontact IC card function by the lock releasing processing, returning the noncontact IC card function to the locked state, when usage of the noncontact IC card function has been completed.

* * * * *